United States Patent [19]
Hale

[11] Patent Number: 5,246,518
[45] Date of Patent: Sep. 21, 1993

[54] PERMANENT SUBLIMATION PRINTING PROCESS

[76] Inventor: Nathan Hale, 782 Hwy. 17 By-Pass, Suite AA, Mt. Pleasant, S.C. 29464

[21] Appl. No.: 914,036

[22] Filed: Jul. 15, 1992

Related U.S. Application Data

[63] Continuation of Ser. No. 549,600, Jul. 9, 1990, abandoned.

[51] Int. Cl.$^5$ .............................................. B32B 31/00
[52] U.S. Cl. .................................... 156/230; 156/235; 156/240; 8/471
[58] Field of Search ..................... 156/230, 240, 583.1, 156/235; 8/471; 346/76 PH

[56] References Cited

U.S. PATENT DOCUMENTS

| | | | |
|---|---|---|---|
| 4,021,591 | 5/1977 | De Vries et al. | 156/230 X |
| 4,558,329 | 12/1985 | Honda | 346/76 PH |
| 4,561,789 | 12/1985 | Saito | 346/76 PH X |
| 4,874,454 | 10/1989 | Talalay et al. | 156/240 X |

FOREIGN PATENT DOCUMENTS 57-102390  6/1982  Japan.

Primary Examiner—David A. Simmons
Assistant Examiner—James J. Engel, Jr.
Attorney, Agent, or Firm—B. Craig Killough

[57] ABSTRACT

An image is permanently printed on an object having a synthetic component by capturing the image, printing the image by means of sublimation ink onto a medium, with the image then transferred from the medium to the object by applying sufficient heat to the medium to sublimate the ink, causing the ink to permanently bond to the object in the desired image. The sublimation ink is transferred to the medium by a printer from a ribbon, and/or by a means having a wax component which will bond the sublimation ink to the medium in precisely the desired design, yielding excellent resolution and bright, vivid colors in the final printing of the image.

3 Claims, 2 Drawing Sheets

PERMANENT SUBLIMATION PRINTING PROCESS

This is a continuation of U.S. Pat. Ser. No. 07/549,600 filed on Jul. 9, 1990, now abandoned.

BACKGROUND OF THE INVENTION

This invention relates to printing generally and more specifically relates to a method of transferring a design onto an object by means of printing the design onto paper or other printable material, and transferring the design from the paper or printable material to an object on which the design is to permanently appear.

Words and designs are frequently printed onto clothing and other textile materials, as well as other objects. Common means of applying such designs to objects include the use of silk screens, and mechanically bonded thermal transfers. Silk screen process is well known in the art, and a mechanical thermal process to textile materials is described in Hare, U.S. Pat. No. 4,244,358.

The use of computer technology has allowed almost instantaneous printing of images. For example, video cameras or scanning may be used to capture an image to a computer. The image may then be printed by any suitable printing means, including mechanical thermal printers, wet printed (inkjet) sublimation transfers and laser printers. These printers will print in multiple colors.

The precess of thermal transfers by mechanical means is described in Hare, U.S. Pat. No. 4,773,953. The art, as developed under this patent, is well known and defined in practice. The resulting mechanical image, as transferred, is a surface bonded image with a raised plastic like feel to the surface. The resulting printed image is stiff to the feel, has poor dimensional stability when stretched and poor color range, providing the incentive to seek a better process to achieve a better result. The uniqueness of this invention, which is described herein, is in the creation of a new parallel on-demand process using a new dry sublimation ribbon technology.

Sublimation ink solids change to a gas at about 400° F., and have a high affinity for polyester at the sublimation temperature and a limited affinity for most other materials. Once the gassification bonding takes place, the ink is permanent and highly resistant to change or fading caused by laundry products.

SUMMARY OF THE PRESENT INVENTION

The present invention uses a sublimation ink solid. The sublimation ink solid is transferred in an unsublimated form in the desired design by means of a printer onto a medium, which will most commonly be paper.

The image is then transferred from the medium onto the desired material. Sublimation does not take place at the time of transfer from the ribbon to the print medium, but rather takes place at the time of the transfer of the image from the medium to the object on to which the image is to be applied. Accordingly, a sufficient temperature to sublimate the ink solids must be used, which is typically around 400° F.

The present invention allows the desired image to be transferred onto a medium almost instantaneously from the creation of the image. This image may be then permanently transferred from the medium onto the object on which it is to be displayed either at the same time, or "stored" to be applied later as desired.

The present invention is vastly superior to the image which results from the transfers described in Hare'358, and Hare'953. The colors which are generated by the use of the sublimation ink solids are much brighter, the resolution of the image is vastly superior, and the image is permanently applied. By sublimating the sublimation ink solids at the time of application of the image onto the object on which it is displayed, the design has a look of being "dyed in" when applied to a textile material. The image does not look or feel as though it has been topically applied. The image will stretch and move as the fabric moves, and is permanently affixed to the object.

DETAILED DESCRIPTION OF THE PREFERRED EMBODIMENT

Figure 1:
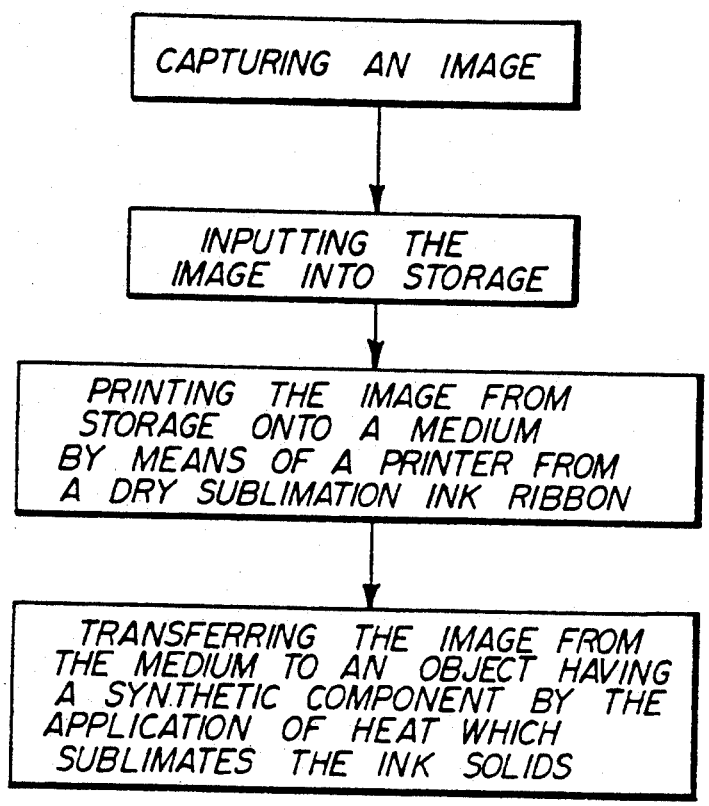
FIG. 1 is a block diagram showing the printing process.
Figure 2:
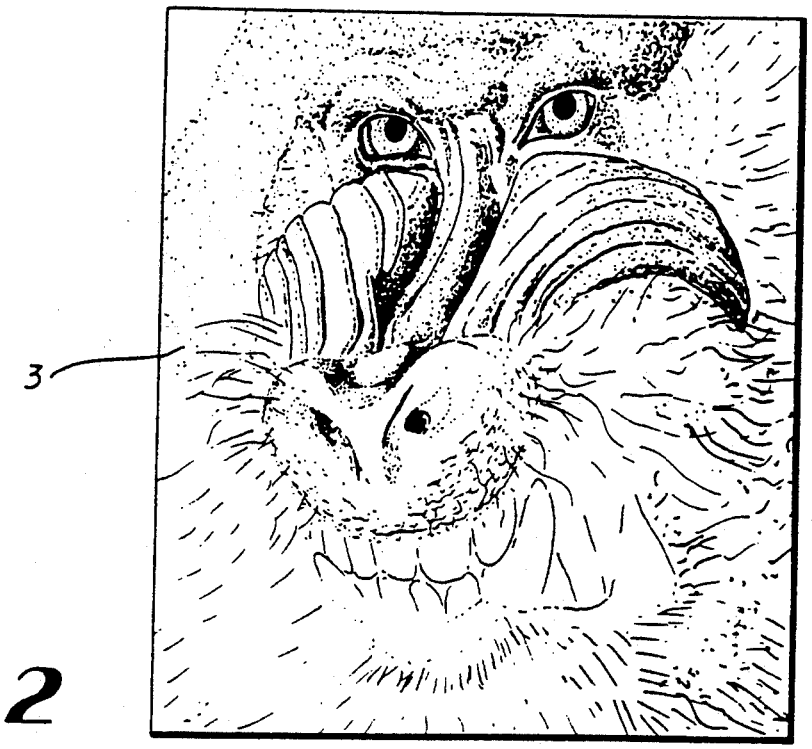
FIG. 2 illustrates an example of a design printed by a printer using the printing process.
Figure 3:
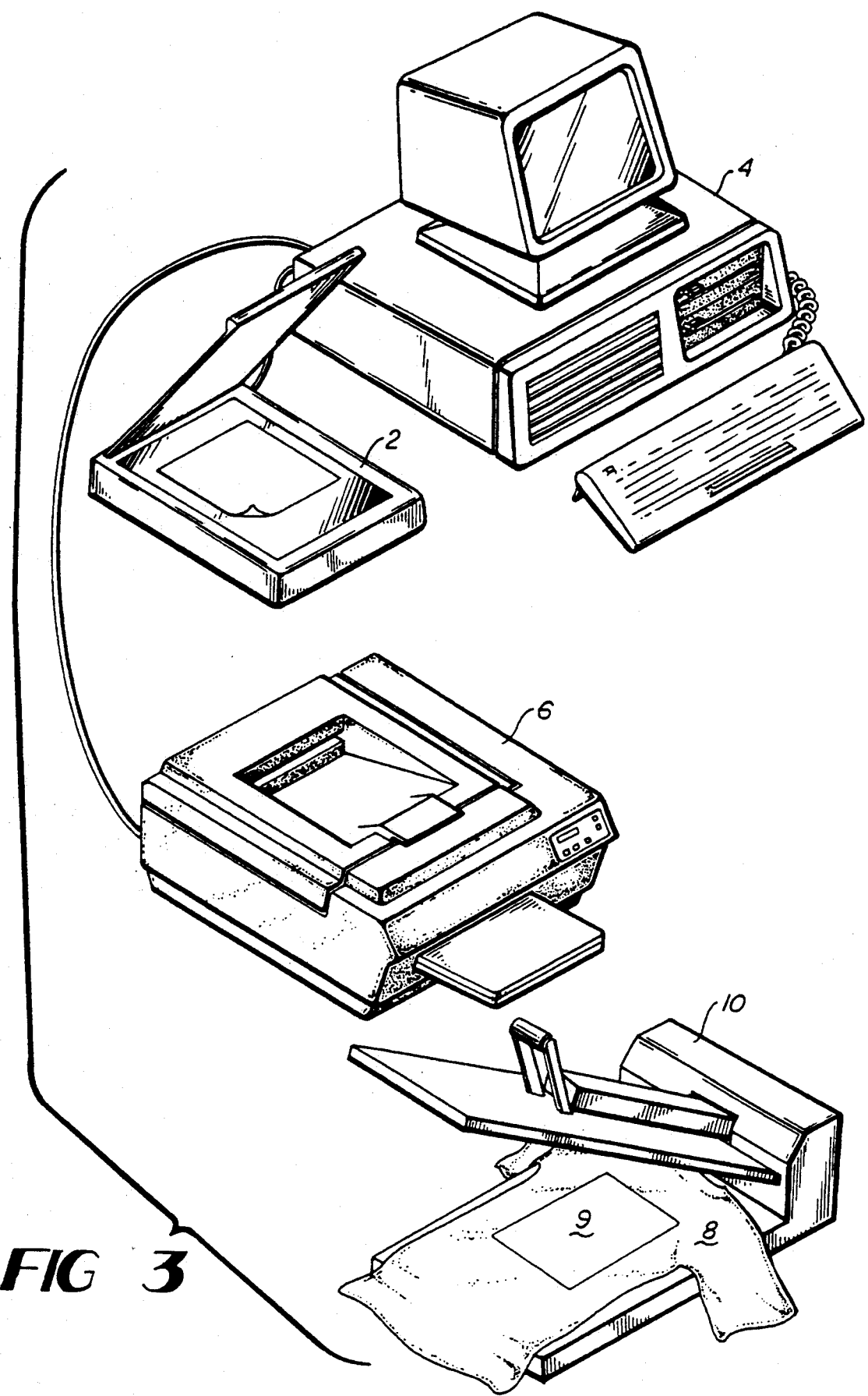
FIG. 3 is a diagrammatic illustration showing exemplary elements of computer and printing systems which could be used to achieve the printing process.

In the preferred embodiment, a video camera or scanning device 2 is used to capture an image 3. This image is then input into a computer 4. The computer directs a printer 6 to print the image.

Any means of inputting an image into a computer may be used. Available computer design graphic software may be used, or still photography may be used. The design may be photographic, graphic artistic, or simply letters or words.

Virtually any printer which will print in response to a computer may be used, including impact, laser or thermal printers. In most applications, a printer which will print in multiple colors is desirable. A thermal printer which will print in what is known as "four pass" (four color) or "three pass" (three color) may be most commonly used, but laser printers having the same multiple color capability are available.

In the present invention, sublimation ink solids are used, and are transferred to a medium in an unsublimated form by the printer. The sublimation ink solids are transferred onto the medium, such as paper, by the printer from a dry sublimation transfer ribbon.

The ribbon to be used with the printer may be a polyester type ribbon. The dry sublimation ink solid can be retained on the polyester ribbon by the use of wax. The printer, such as a thermal transfer printer, will transfer the ink in the desired design and colors from the ribbon to the medium at a temperature of approximately 140° F. This temperature is sufficient to melt the wax to allow transfer of the sublimation ink solid, without sublimating the ink solid, which is critical to the invention.

The quality of the image is achieved in part through the use of the ribbon to which the sublimation ink solids are bonded by means of wax. The wax is melted by the printer, which releases not only the ink solids, but also the wax, some of which is transferred to the medium. The wax aids in holding the sublimation ink solids on the medium in the precise design, eliminating the need for special paper, while also producing an image which has high resolution.

The wax component is used to bond the ink solids to the paper. The printing of sublimation ink solids to paper without wax results in poor bonding of the ink solids to the paper, which in turn leads to poor resolution and a lessening in the quality and intensity of the colors applied. While in the preferred embodiment the wax is applied with the ink solids from a ribbon, other means of applying the ink solids with a wax could be used, as long as the printer or application device achieves a temperature which is sufficient to melt the wax. Since the wax in melted form tends to have an affinity for paper, the wax will readily bond with the paper medium, holding the ink solids to the medium, until the ink solids are released by the application of heat which is sufficient to sublimate the ink solids.

Virtually any material may be used as a medium which can be printed upon by a printer, and which will withstand the sublimation temperature of 400° F., as is described herein. If a thermal printer is used, this medium may be any paper commonly used with thermal printers, however, standard bond paper may be used, or even a sheet of metal, if the metal can be run through the printer.

It is not necessary to use thermal transfer paper, such as "Singapore Dammar Resin Coated Sheet", or thermal transfer paper marketed under the trademark Fotowear. The present process is not a transfer which requires the use of such paper.

Once the image is transferred onto the medium, the image may be permanently transferred onto an object presently, or at a later time. Most commonly, the design will be transferred onto a textile material, such as a shirt 8, although the image may be transferred onto other materials, such as metal, wood, or plastic.

The design 3, which is printed onto the medium 9 with the ink in an unsublimated form, is placed against the object 8. A temperature which is sufficient to sublimate the ink solids is then applied. This temperature will typically be around 400° F. This temperature is applied for a time sufficient to sublimate the ink solids. A heat transfer machine 10 may be used to accomplish the sublimation process.

The sublimation process takes place at the time of transferring the image from the medium onto the object on which the design is to appear. The sublimation process does not take place at the time of printing the image onto the medium.

The sublimation ink solid will bond to a synthetic material such as polyester, when sufficient heat is applied for a sufficient time. Accordingly, if the object to which the design is to be applied is a textile material, it should have a synthetic material, such as a polyester composition. For example, a tee-shirt to which a design is to be applied should be 100% polyester, or at least a blend of polyester or cotton. A blend of polyester plus other materials, such as wool, could be used. If the design is to be applied from the medium to an object such as metal, wood, or plastic, a synthetic coating may be applied, such as by spraying, to the surface of the metal, wood, or plastic, and allowed to set. The design may then be applied to the object in the manner disclosed above, by applying sufficient heat to sublimate said ink solids.

What is claimed is:

1. A method of printing a multiple color design using sublimation ink solids, comprising the steps of:
    a. printing by thermal means sublimation ink solids in at least three colors in a multiple color design onto a medium at a temperature which is below the temperature at which said sublimation ink solids sublimate; and
    b. transferring said sublimation ink solids from said medium to an object on which the multiple color design is to appear by thermal means at a temperature which will cause said sublimation ink solids to sublimate, and cause sufficient of said sublimation ink solids to bond to said object in the multiple color design.

2. A method of printing a multiple color design using sublimation ink solids, comprising the steps of:
    a. creating a multiple color design;
    b. printing by thermal means sublimation ink solids in at least three colors in said multiple color design onto a medium at a temperature which is in a range of temperatures below a temperature at which said sublimation ink solids sublimate and above a temperature which will cause said ink solids to be thermally transferred to said medium wherein the multiple color design is produced on said medium by said sublimation ink solids; and
    c. tranferring said sublimation ink solids from said medium to an object on which the design is to appear by thermal means at a temperature which is in a range of temperatures which will cause said sublimation ink solids to sublimate, and cause said sublimation ink solids to bond to said object in the multiple color design.

3. A method of printing a multiple color design using sublimation ink solids, comprising the steps of:
    a. printing by thermal means sublimation ink solids in at least three colors bonded to a ribbon by means of wax at a temperature which is in a range of temperatures below a temperature at which sublimation ink solids sublimate, but above a temperature at which said wax will melt and release said sublimation ink solids from said ribbon onto said medium in a multiple color design wherein the multiple color design is produced on said medium by said sublimation ink solids; and
    b. tranferring said sublimation ink solids from said medium to an object on which the design is to appear by thermal means at a temperature which is in a range of temperatures which will cause said sublimation ink solids to sublimate, and cause sufficient sublimation ink solids to bond to said object in the multiple color design.

* * * * *